US012720104B2

(12) United States Patent
Jang et al.

(10) Patent No.: US 12,720,104 B2
(45) **Date of Patent: *Aug. 25, 2026**

(54) APPARATUS FOR PERFORMING IMAGE CODING ON BASIS OF ATMVP CANDIDATE

(71) Applicant: GUANGDONG OPPO MOBILE TELECOMMUNICATIONS CORP., LTD., Dongguan (CN)

(72) Inventors: Hyeongmoon Jang, Seoul (KR); Junghak Nam, Seoul (KR); Jaehyun Lim, Seoul (KR)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/970,864

(22) Filed: Dec. 5, 2024

(65) Prior Publication Data

US 2025/0097455 A1 Mar. 20, 2025

Related U.S. Application Data

(63) Continuation of application No. 18/525,164, filed on Nov. 30, 2023, now Pat. No. 12,206,891, which is a continuation of application No. 17/887,911, filed on Aug. 15, 2022, now Pat. No. 11,871,029, which is a continuation of application No. 17/283,926, filed as application No. PCT/KR2019/013230 on Oct. 8, 2019, now Pat. No. 11,457,234.

(60) Provisional application No. 62/742,925, filed on Oct. 8, 2018.

(51) Int. Cl.

| | |
|---|---|
| ***H01L 29/94*** | (2006.01) |
| ***H04N 19/132*** | (2014.01) |
| ***H04N 19/176*** | (2014.01) |
| ***H04N 19/31*** | (2014.01) |
| ***H04N 19/52*** | (2014.01) |
| ***H04N 19/55*** | (2014.01) |

(52) U.S. Cl.

CPC ........... *H04N 19/52* (2014.11); *H04N 19/132* (2014.11); *H04N 19/176* (2014.11); *H04N 19/31* (2014.11); *H04N 19/55* (2014.11)

(58) Field of Classification Search

CPC ...... H04N 19/52; H04N 19/31; H04N 19/132; H04N 19/176; H04N 19/55

See application file for complete search history.

(56) References Cited

U.S. PATENT DOCUMENTS 10,951,884 B2 * 3/2021 Moon .................... H04N 19/44
2003/0108099 A1 * 6/2003 Nagumo ................... G06T 9/20 375/E7.199
2005/0053294 A1 * 3/2005 Mukerjee ............... H04N 19/51 375/E7.125

(Continued)

*Primary Examiner* — Joseph Suh
(74) *Attorney, Agent, or Firm* — Hodgson Russ LLP

(57) ABSTRACT

A method for image decoding performed by a decoding apparatus according to the present disclosure comprises the steps of: deriving an ATMVP candidate for a current block; deriving merge candidates for the current block; deriving prediction samples for the current block on the basis of the merge candidates and the ATMVP candidate; and deriving reconstruction samples for the current block on the basis of the prediction samples, wherein the ATMVP candidate is a spatial neighboring block spatially adjacent to the current block.

4 Claims, 11 Drawing Sheets

| index | MV of X |
|---|---|
| 0 | $MV_0$ |
| 1 | $MV_1$ |
| 2 | $MV_2$ |
| 3 | $MV_3$ |
| 4 | |
| 5 | |
| ••• | |
| maxHmvpBufNum-1 | |

Use motion information for ATMVP derivation

(56) References Cited

U.S. PATENT DOCUMENTS

| | | | | |
|---|---|---|---|---|
| 2005/0206741 | A1* | 9/2005 | Raber | H04N 5/907 386/E5.067 |
| 2006/0126962 | A1* | 6/2006 | Sun | H04N 19/895 382/268 |
| 2015/0085935 | A1* | 3/2015 | Chen | H04N 19/597 375/240.16 |
| 2016/0219278 | A1* | 7/2016 | Chen | H04N 19/52 |
| 2016/0381383 | A1* | 12/2016 | Oh | H04N 19/52 375/240.16 |
| 2017/0332099 | A1* | 11/2017 | Lee | H04N 19/122 |
| 2018/0070100 | A1* | 3/2018 | Chen | H04N 19/597 |
| 2018/0255316 | A1* | 9/2018 | Zhang | H04N 19/503 |
| 2018/0310017 | A1* | 10/2018 | Chen | H04N 19/52 |
| 2019/0182502 | A1* | 6/2019 | Xu | H04N 19/513 |
| 2021/0076029 | A1* | 3/2021 | Han | H04N 19/176 |
| 2021/0136400 | A1* | 5/2021 | Chen | H04N 19/513 |

* cited by examiner

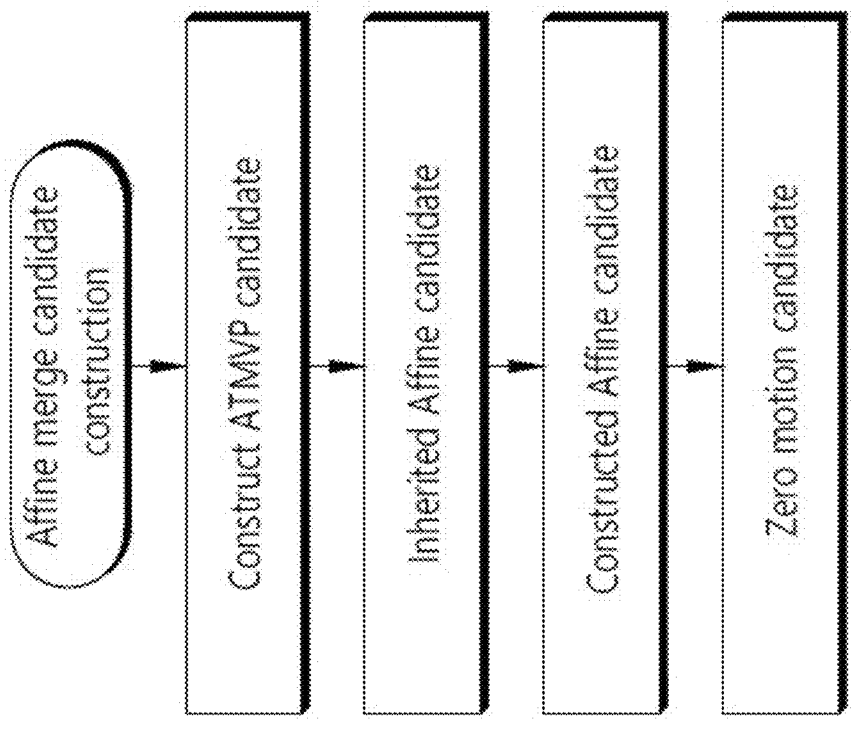
FIG. 4
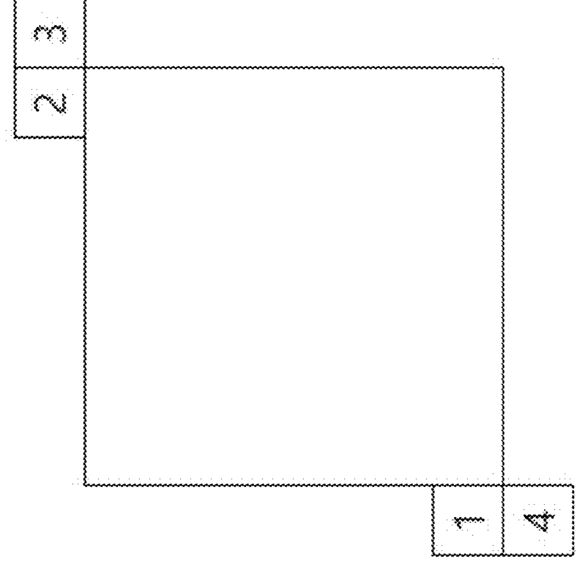

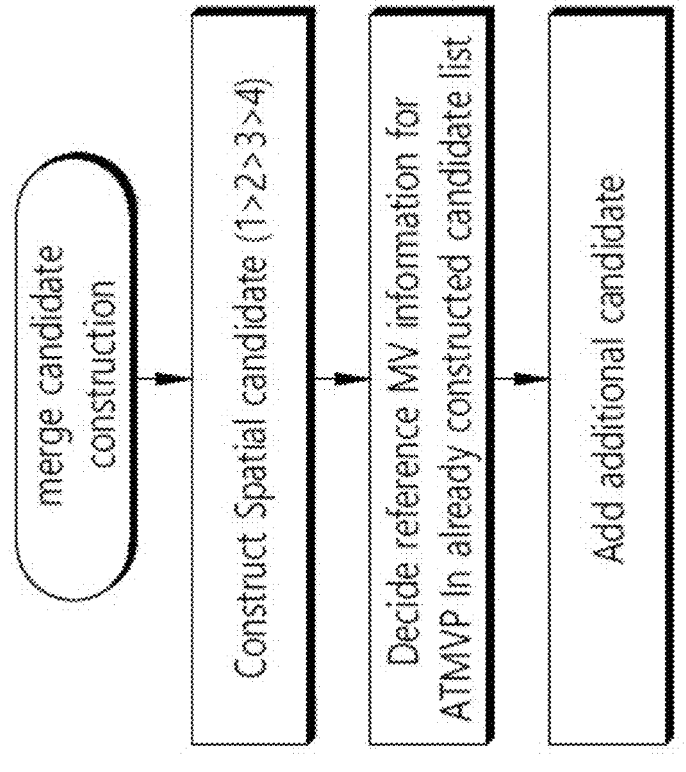
FIG. 5
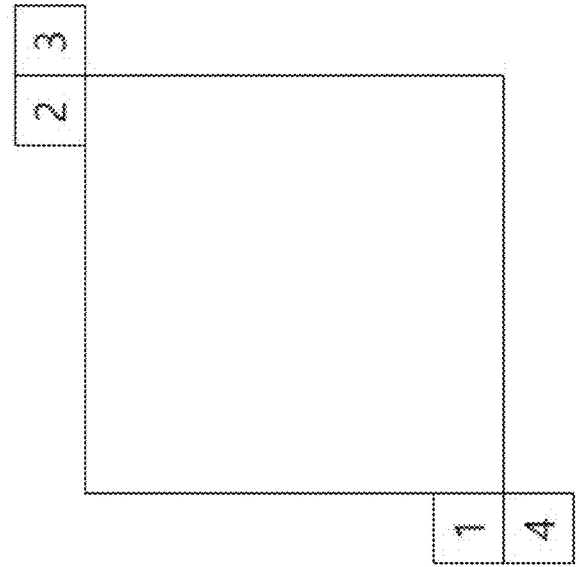

| index | MV of X |
| --- | --- |
| 0 | $MV_0$ |
| 1 | $MV_1$ |
| 2 | $MV_2$ |
| 3 | $MV_3$ |
| 4 | |
| 5 | |
| ••• | |
| maxHmvpBufNum-1 | |

Use motion information for ATMVP derivation

APPARATUS FOR PERFORMING IMAGE CODING ON BASIS OF ATMVP CANDIDATE

CROSS-REFERENCE TO RELATED APPLICATIONS

This application is a continuation of U.S. application Ser. No. 18/525,164, filed on Nov. 30, 2023, which is a continuation of U.S. application Ser. No. 17/887,911, filed on Aug. 15, 2022, now U.S. Pat. No. 11,871,029, which is a continuation of U.S. application Ser. No. 17/283,926, filed on Apr. 8, 2021, now U.S. Pat. No. 11,457,234, which is a National Stage application under 35 U.S.C. § 371 of International Application No. PCT/KR2019/013230, filed on Oct. 8, 2019, which claims the benefit of U.S. Provisional Application No. 62/742,925 filed on Oct. 8, 2018. The entire disclosures of the aforementioned applications are incorporated herein by reference.

BACKGROUND OF THE DISCLOSURE

Field of the Disclosure

The present disclosure relates to an image coding technology, and more specifically, to an apparatus for performing image coding based on an advanced temporal motion vector prediction (ATMVP) candidate in an image coding system.

Related Art

Recently, the demand for high resolution, high quality image/video such as 4K or 8K Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

An object of the present disclosure is to provide a method and an apparatus for enhancing image coding efficiency.

Another object of the present disclosure is to provide a method and an apparatus for performing image coding based on an ATMVP candidate.

Still another object of the present disclosure is to provide a method and an apparatus for performing the image coding based on the ATMVP candidate at a predefined position.

Yet another object of the present disclosure is to provide a method and an apparatus for performing the image coding based on a predefined ATMVP candidate without temporarily generating an ATMVP candidate list.

Still yet another object of the present disclosure is to provide a method and an apparatus for performing the image coding by determining a spatial neighboring block adjacent to the left of a current block (or current transform block) as an ATMVP candidate.

An exemplary embodiment of the present disclosure provides an image decoding apparatus performed by a decoding apparatus. The method includes deriving an ATMVP candidate for a current block, deriving merge candidates for the current block, deriving prediction samples for the current block based on the merge candidates and the ATMVP candidate, and deriving reconstructed samples for the current block based on the prediction samples, in which the ATMVP candidate is a spatial neighboring block spatially adjacent to the current block.

Another exemplary embodiment of the present disclosure provides a decoding apparatus for performing image decoding. The decoding apparatus includes a predictor configured to derive an ATMVP candidate for a current block, derive merge candidates for the current block, and derive prediction samples for the current block based on the merge candidates and the ATMVP candidate and an adder configured to derive reconstructed samples for the current block based on the prediction samples, in which the ATMVP candidate is a spatial neighboring block spatially adjacent to the current block.

Still another exemplary embodiment of the present disclosure provides an image encoding method performed by an encoding apparatus. The method includes deriving an ATMVP candidate for a current block, deriving merge candidates for the current block, deriving prediction samples for the current block based on the merge candidates and the ATMVP candidate, deriving residual samples for the current block based on the prediction samples, and encoding image information including information about the residual samples, in which the ATMVP candidate is a spatial neighboring block spatially adjacent to the current block.

Yet another exemplary embodiment of the present disclosure provides an encoding apparatus for performing image encoding. The encoding apparatus includes a predictor configured to derive an ATMVP candidate for a current block, derive merge candidates for the current block, and derive prediction samples for the current block based on the merge candidates and the ATMVP candidate, a residual processor configured to derive residual samples for the current block based on the prediction samples, and an entropy encoder configured to encode image information including information about the residual samples, in which the ATMVP candidate is a spatial neighboring block spatially adjacent to the current block.

Still yet another exemplary embodiment of the present disclosure provides a decoder readable storage medium configured to store information about instructions causing a video decoding apparatus to perform decoding methods according to some exemplary embodiments.

Further another exemplary embodiment of the present disclosure provides a decoder readable storage medium configured to store information about instructions causing a video decoding apparatus to perform decoding methods according to some exemplary embodiments. The decoding method according to the exemplary embodiment includes deriving an ATMVP candidate for a current block, deriving merge candidates for the current block, deriving prediction samples for the current block based on the merge candidates and the ATMVP candidate, and deriving reconstructed samples for the current block based on the prediction samples, in which the ATMVP candidate is a spatial neighboring block spatially adjacent to the current block.

The present disclosure may enhance the overall image/video compression efficiency.

The present disclosure may enhance the image coding efficiency by performing the image coding based on the ATMVP candidate.

The present disclosure may enhance the image coding efficiency by performing the image coding based on the ATMVP candidate at the predefined position.

The present disclosure may enhance the image coding efficiency by performing the image coding based on the predefined ATMVP candidate without temporarily generating the ATMVP candidate list.

The present disclosure may perform the image coding by determining the spatial neighboring block adjacent to the left of the current block (or the current transform block) as the ATMVP candidate.

BRIEF DESCRIPTION OF THE DRAWINGS

FIG. 4 is a flowchart illustrating an example in which an ATMVP candidate is used as an (affine) merge candidate.

FIG. 5 is a flowchart illustrating another example in which the ATMVP candidate is used as the merge candidate.

DESCRIPTION OF EXEMPLARY EMBODIMENTS

Figure 1:
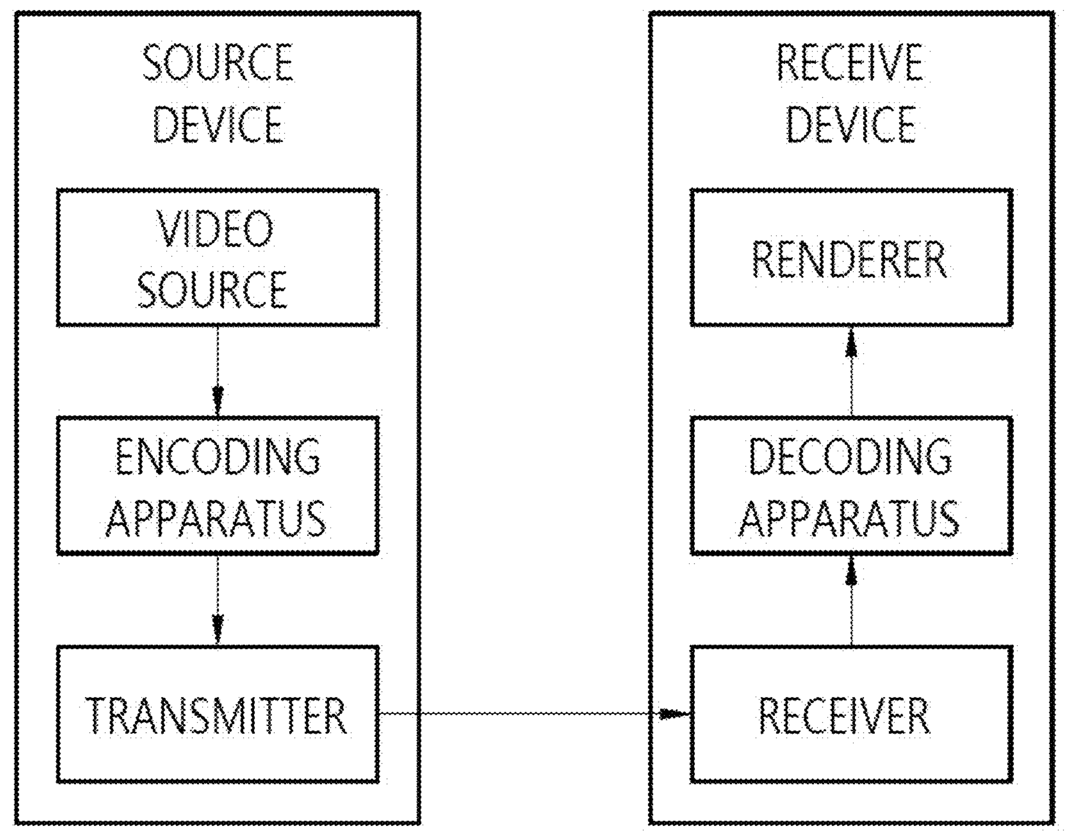
FIG. 1 schematically illustrates an example of a video/image coding system to which the present disclosure is applicable.

An exemplary embodiment of the present disclosure provides an image decoding method performed by a decoding apparatus. The method includes deriving an ATMVP candidate for a current block, deriving merge candidates for the current block, deriving prediction samples for the current block based on the merge candidates and the ATMVP candidate, and deriving reconstructed samples for the current block based on the prediction samples, in which the ATMVP candidate is a spatial neighboring block spatially adjacent to the current block.

This disclosure may be modified in various forms, and specific embodiments thereof will be described and shown in the drawings. However, the embodiments are not intended for limiting this disclosure. The terms used in the following description are used to merely describe specific embodiments, but are not intended to limit this disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each of the components in the drawings described in this disclosure are shown independently for the convenience of description regarding different characteristic functions, and do not mean that the components are implemented in separate hardware or separate software. For example, two or more of each configuration may be combined to form one configuration, or one configuration may be divided into a plurality of configurations. Embodiments in which each configuration is integrated and/or separated are also included in the scope of this disclosure without departing from the spirit of this disclosure.

Hereinafter, exemplary embodiments of this disclosure will be described in detail with reference to the accompanying drawings. Hereinafter, the same reference numerals are used for the same components in the drawings, and redundant description of the same components may be omitted.

FIG. 1 is schematically illustrating a video/image coding system to which this disclosure may be applied.

Referring to FIG. 1, a video/image coding system may include a first apparatus (a source device) and a second apparatus (a receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In this document, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either the number of complete tiles or only a consecutive sequence of complete bricks of one tile. Tile groups and slices may be used interchangeably in this document. For example, in this document, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex., Cb, cr) blocks. The unit may be used interchangeably with terms such as block or area in some cases. In a general case, an M×N block may include samples (or sample arrays) or a set (or array) of transform coefficients of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 2:
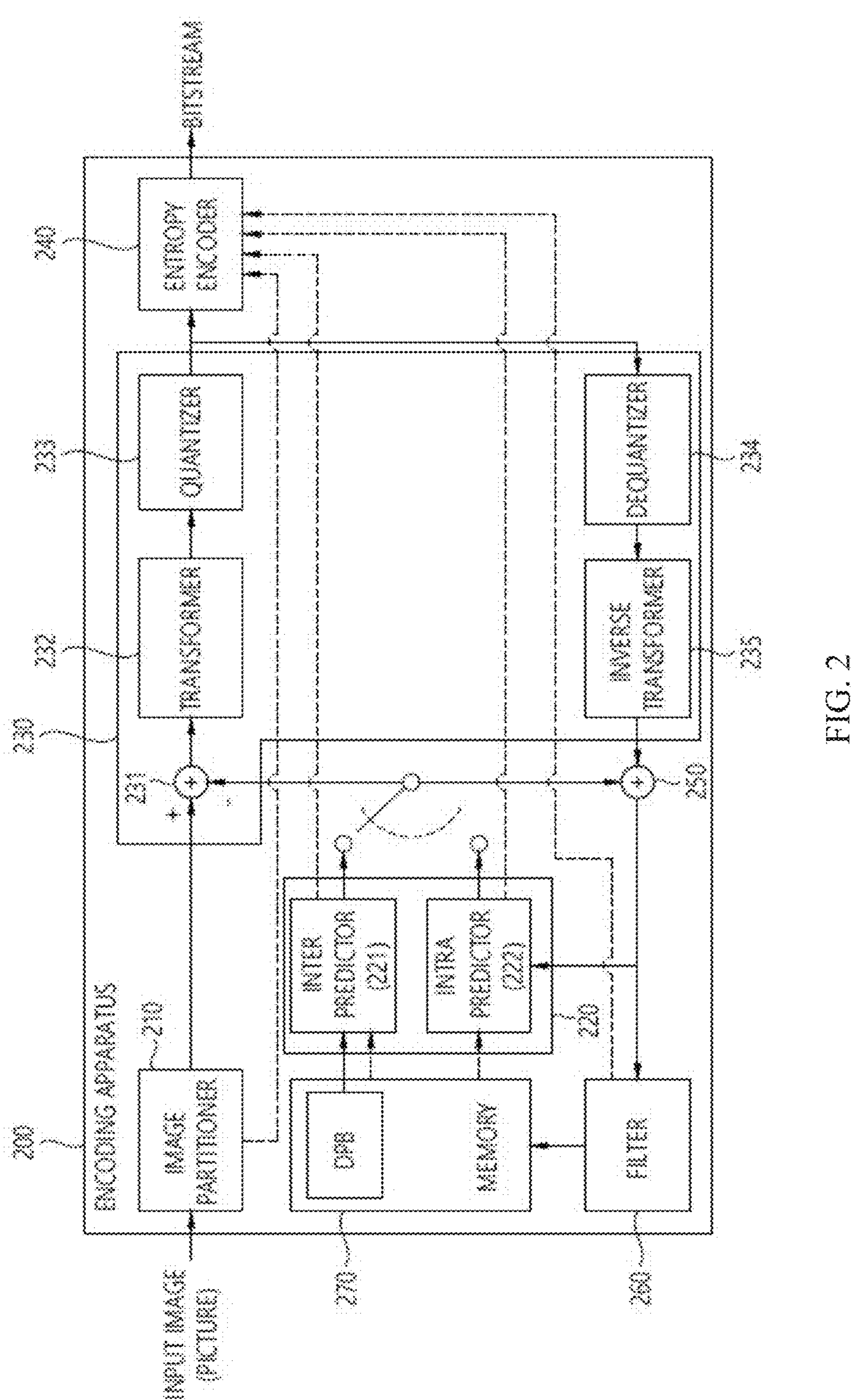
FIG. 2 is a diagram for schematically explaining a configuration of a video/image encoding apparatus to which the present disclosure is applicable.

FIG. 2 is a schematic diagram illustrating a configuration of a video/image encoding apparatus to which the embodiments of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various kinds of information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. Encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various kinds of information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
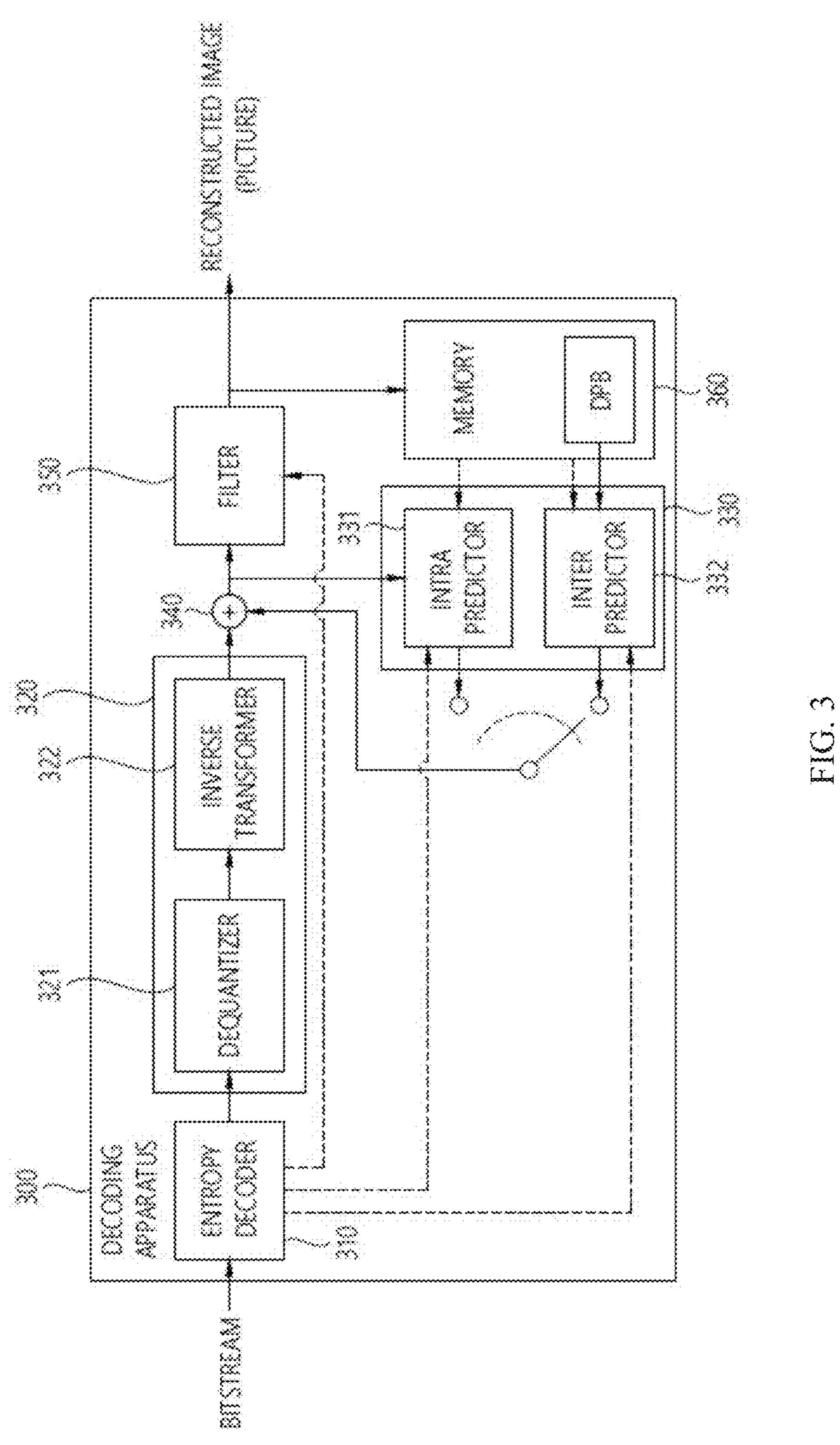
FIG. 3 is a diagram for schematically explaining a configuration of a video/image decoding apparatus to which the present disclosure is applicable.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block. The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture.

For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, a prediction is performed to enhance compression efficiency. A predicted block including prediction samples for a current block, that is, a target coding block, may be generated through the prediction. In this case, the predicted block includes the prediction samples in a spatial domain (or pixel domain). The predicted block is identically derived in the encoding apparatus and the decoding apparatus. The encoding apparatus may enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

FIG. 4 is a flowchart illustrating an example in which an ATMVP candidate is used as an (affine) merge candidate, and FIG. 5 is a flowchart illustrating another example in which the ATMVP candidate is used as the merge candidate.

The "affine merge candidate" used throughout the present specification is merely an example of the merge candidate, such that the affine merge candidate should be interpreted as being substitutable with a subblock merge candidate, a merge subblock candidate, or a merge candidate. Likewise, the "merge candidate" used throughout the present specification may be interpreted as indicating some of the affine merge candidate, the subblock merge candidate, the merge subblock candidate, and a normal merge candidate.

According to the exemplary embodiment illustrated in FIG. 4, the encoding apparatus and/or the decoding apparatus may configure an ATMVP candidate, derive an inherited affine (merge) candidate, derive a constructed affine (merge) candidate, and derive a zero motion candidate in order to configure the (affine) merge candidate(s).

According to the exemplary embodiment illustrated in FIG. 5, the encoding apparatus and/or the decoding apparatus may search spatial candidates 1, 2, 3, 4 illustrated in FIG. 4 in the order of 1>2>3>4, determine reference motion information for the ATMVP in the configured candidate list, and additionally add a candidate in order to configure the merge candidate(s).

FIG. 4 illustrates an example of a method for inducing the ATMVP candidate if the ATMVP is used as the affine merge candidate. The ATMVP among the affine merge candidates may be first configured. The encoding apparatus and/or the decoding apparatus according to the exemplary embodiment may travel (or search) a left position of a current block (or current transform block) illustrated in FIG. 4 and then configure a temporary candidate list based on a valid predictor. The encoding apparatus and/or the decoding apparatus may induce a corresponding candidate position based on motion information of a candidate satisfying a valid ATMVP candidate condition in the configured temporary candidate list and use the motion information at the corresponding position as the motion information of the ATMVP. As an example, the reason of configuring the temporary candidate list for the ATMVP may be to configure the motion candidate while performing operations illustrated in FIG. 5 and then to configure the ATMVP candidate based on the configured (temporary) candidate list, in a process of using the ATMVP in a (normal) merge mode.

In the process of configuring the ATMVP candidate in the ATMVP used as the (normal) merge candidate, if the temporal motion information corresponding to the maximum four spatial candidates already configured indicates the same picture as a collocated picture of a current picture, the corresponding motion information may be used as the ATMVP. At this time, a process of traveling the configured maximum four candidates and checking the condition is complex, such that an exemplary embodiment may propose a simplified method for checking whether to satisfy the valid ATMVP condition with reference to only the first candidate in the configured candidate list. However, when the ATMVP is used as the (affine) merge candidate, such a simplified process has a less simplified effect in the process of configuring the ATMVP candidate list. The first candidate of the already configured candidate list is used in the normal merge, but the (temporary) candidate list, which is not used when the ATMVP is used as the affine merge candidate, should be configured, such that in the worst case, the first candidate should be selected after the (temporary) candidate list is configured based on the four candidates. In configuring the ATMVP candidate list when the ATMVP is used as the (affine) merge candidate, a method for using a method similar to the simplified method will be described with reference to FIG. 6 below.

Figure 6:
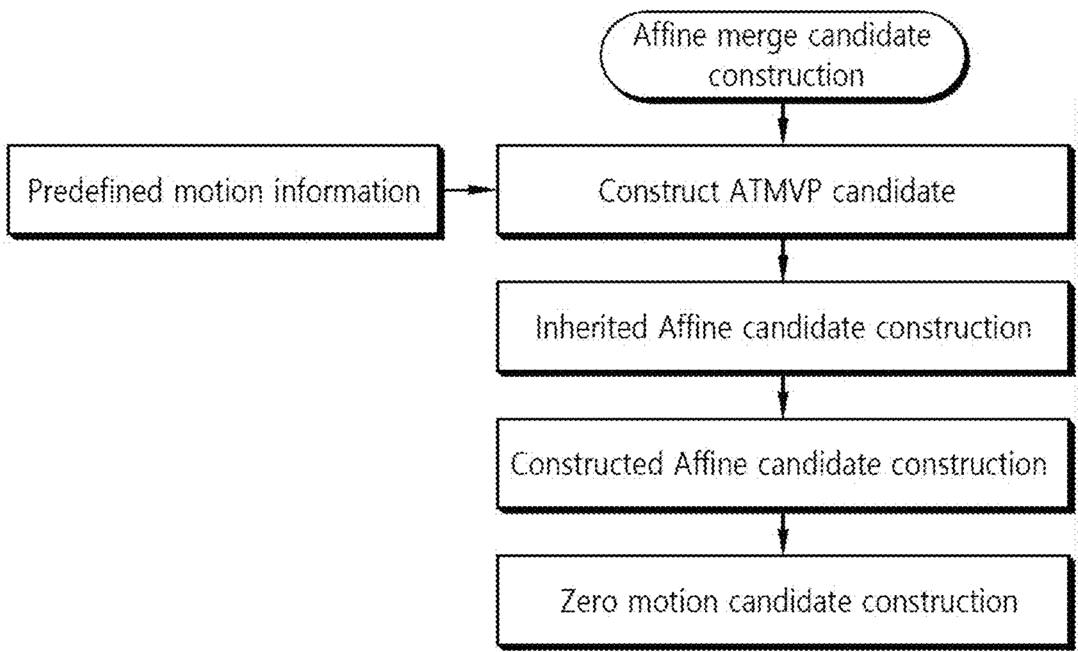
FIG. 6 is a flowchart illustrating still another example in which the ATMVP candidate is used as the (affine) merge candidate.

FIG. 6 is a flowchart illustrating still another example in which the ATMVP candidate is used as the (affine) merge candidate.

In consideration of the fact indicating that the simplified process may have less effect in the process of configuring the ATMVP candidate list when the ATMVP is used as the (affine) merge candidate, an exemplary embodiment illustrated in FIG. 6 proposes a method for configuring the ATMVP candidate using a predefined candidate position or candidate value without configuring the temporary motion list.

Referring to the flowchart illustrated in FIG. 6, it may be confirmed that the ATMVP candidate may be configured based on predefined motion information. The predefined motion information illustrated in FIG. 6 may be determined based on a position of one of the spatial candidates, an HMVP candidate, or a CPMV of a neighboring affine block. A more detailed process of deriving (or inducing) the ATMVP candidate will be described later with reference to FIGS. 11 and 12.

Figure 7:
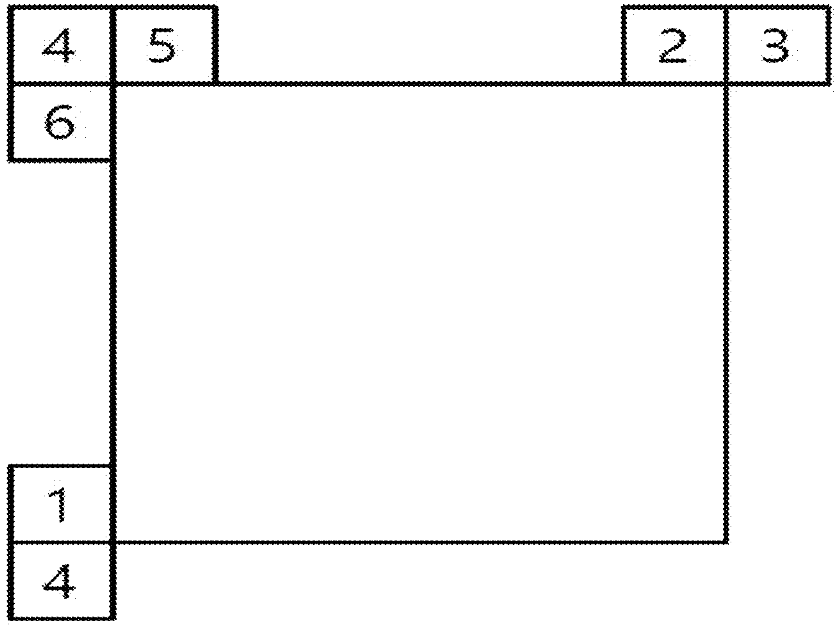
FIG. 7 is a diagram for explaining an example of determining the ATMVP candidate.

FIG. 7 is a diagram for explaining an example of determining the ATMVP candidate.

As described above in the exemplary embodiment illustrated in FIG. 6, an exemplary embodiment proposes a method for inducing the ATMVP candidate with reference to only a predefined one spatial motion candidate to simplify the process of inducing the ATMVP candidate, if the ATMVP is used in the process of deriving the (affine) merge candidate. As an example, the predefined spatial motion candidate may use one of the spatial candidates (1 to 6) indicated by the number in FIG. 7. For example, if a position of the predefined spatial candidate is No. 1, the process of inducing the ATMVP candidate may be based on a method to be described later with reference to FIGS. 11 and 12. As an example, if the position of the predefined spatial candidate is No. 1, CandidatePos for inducing availableFlagCandidatePos, refIdxLXCandidatePos, predFlagLXCandidatePos, and mvLXCandidatePos, which are inputs to be described later with reference to FIGS. 11 and 12, may be based on information of a block at the position of No. 1.

Figure 8:
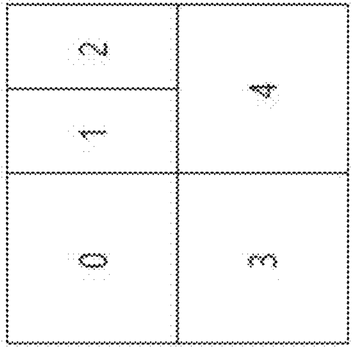
FIG. 8 is a diagram for explaining an example of determining the ATMVP candidate based on HMVP candidates.

FIG. 8 is a diagram for explaining an example of determining the ATMVP candidate based on HMVP candidates.

An exemplary embodiment proposes a method for inducing the ATMVP candidate with reference to only one predefined spatial virtual candidate in order to simplify the process of inducing the ATMVP candidate, if the ATMVP is used in the process of deriving the affine merge candidate. The virtual candidate according to the present exemplary embodiment may mean, for example, an HMVP. Motion information of a previously decoded block in the HMVP may be stored in an HMVP buffer, and the stored motion information may be used as the merge candidate or an AMVP (or ATMVP) candidate. The present exemplary embodiment proposes the method for inducing the ATMVP candidate with reference to the HMVP candidate.

The process of inducing the ATMVP candidate may be based on the process of deriving the ATMVP candidate to be described later with reference to FIGS. 11 and 12. For example, if the motion information popped from the HMVP buffer is No. 3 index, CandidatePos for inducing availableFlagCandidatePos, refIdxLXCandidatePos, predFlagLXCandidatePos, and mvLXCandidatePos, which are the inputs in the process of deriving the ATMVP candidate to be described later with reference to FIGS. 11 and 12, may be based on motion information of No. 3 index of HMVP.

Figure 9:
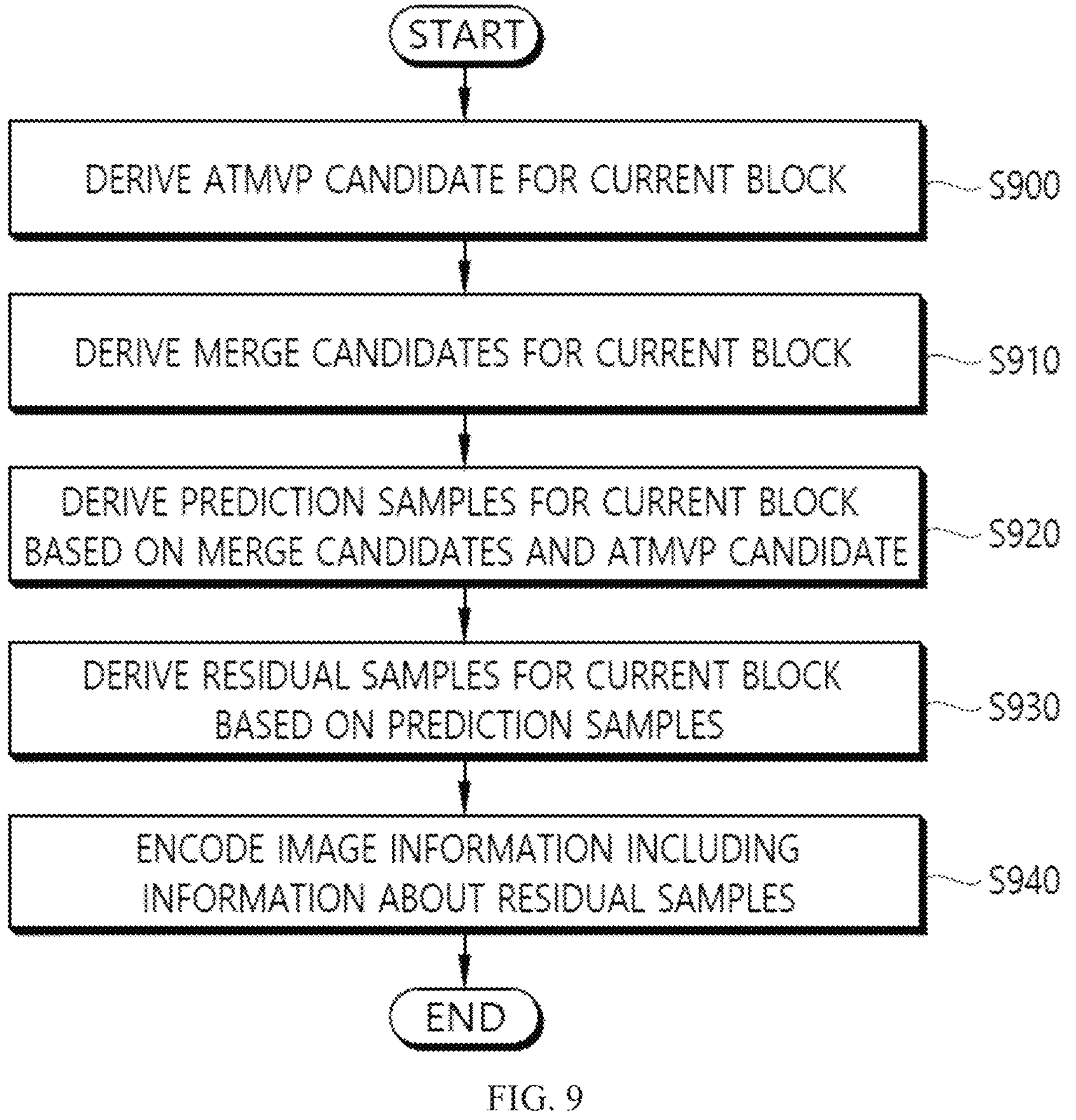
FIG. 9 is a flowchart illustrating an operation of an encoding apparatus according to the exemplary embodiment.
Figure 10:
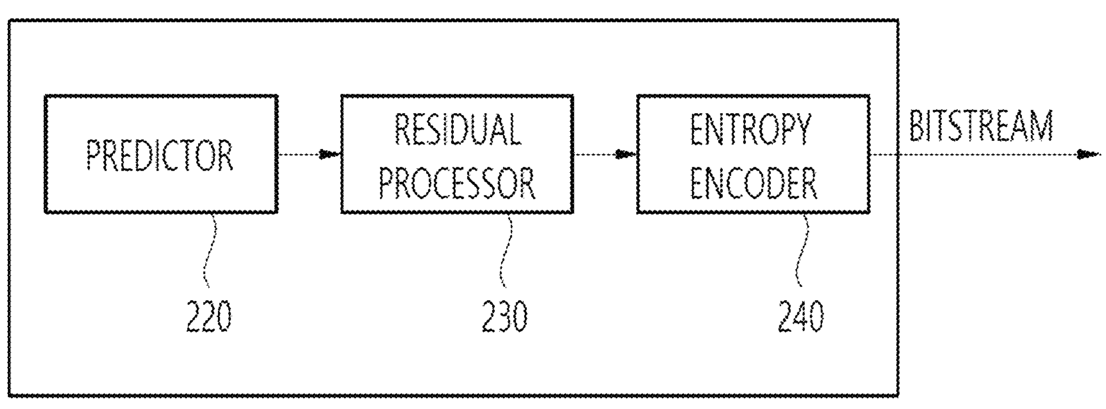
FIG. 10 is a block diagram illustrating a configuration of the encoding apparatus according to the exemplary embodiment.

FIG. 9 is a flowchart illustrating an operation of the encoding apparatus according to the exemplary embodiment, and FIG. 10 is a block diagram illustrating a configuration of the encoding apparatus according to the exemplary embodiment.

Figure 11:
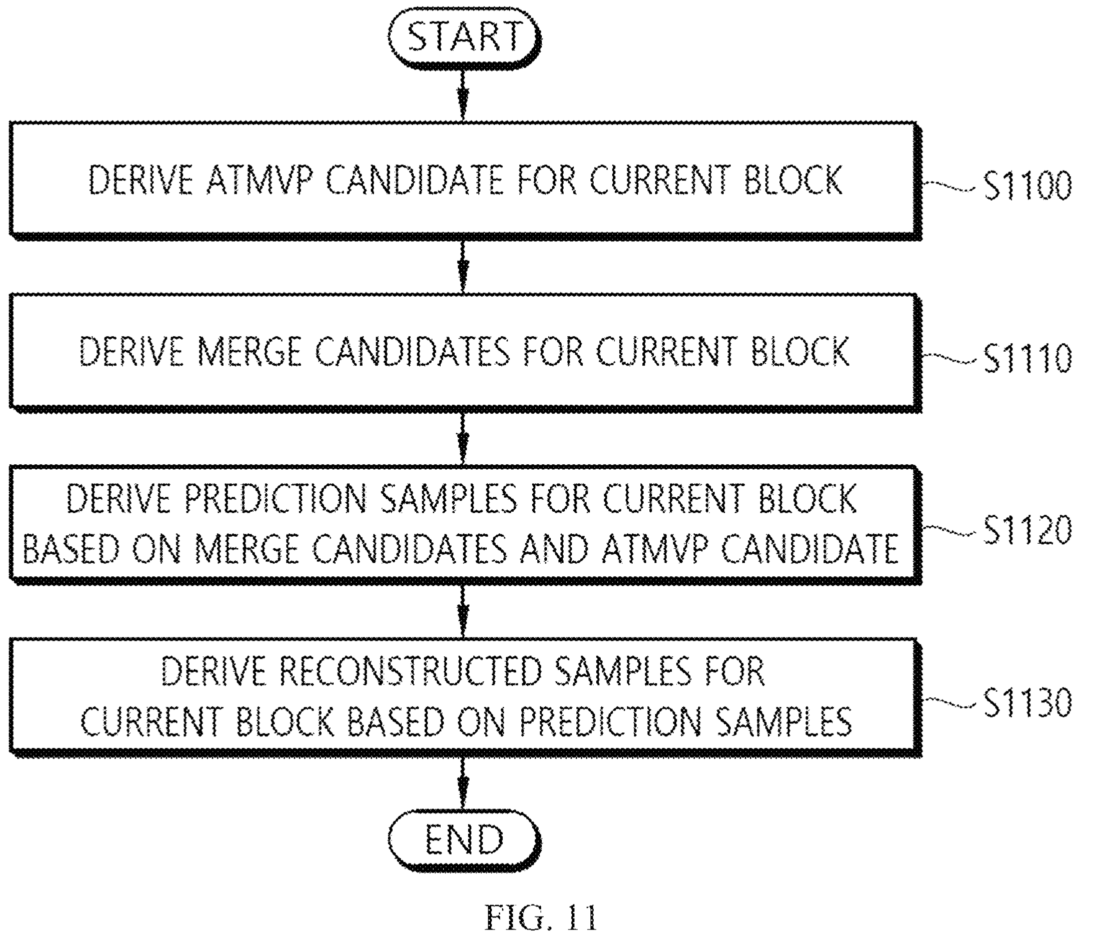
FIG. 11 is a flowchart illustrating an operation of a decoding apparatus according to the exemplary embodiment.
Figure 12:
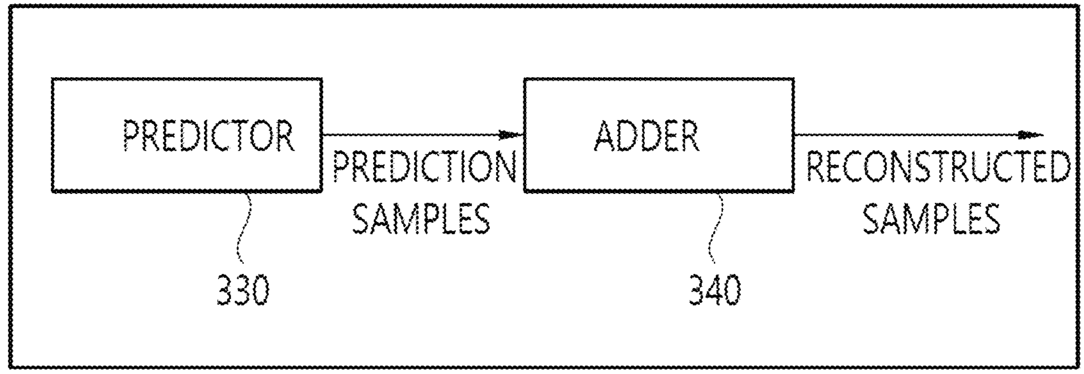
FIG. 12 is a block diagram illustrating a configuration of the decoding apparatus according to the exemplary embodiment.

The encoding apparatus illustrated in FIGS. 9 and 10 may perform operations corresponding to the decoding apparatus illustrated in FIGS. 11 and 12. Therefore, operations of the decoding apparatus to be described later with reference to FIGS. 11 and 12 may also be applied to the encoding apparatus illustrated in FIGS. 9 and 10.

Each step illustrated in FIG. 9 may be performed by the encoding apparatus 200 illustrated in FIG. 2. More specifically, S900 to S920 may be performed by the predictor 220 illustrated in FIG. 2, S930 may be performed by the residual processor 230 illustrated in FIG. 2, and S940 may be performed by the entropy encoder 240 illustrated in FIG. 2. Further, operations according to the S900 to S940 are based on some of the descriptions described above with reference to FIGS. 4 to 8. Therefore, a description of specific contents overlapping with the contents described above with reference to FIG. 2 and FIGS. 4 to 8 will be omitted or simplified.

As illustrated in FIG. 10, the encoding apparatus according to the exemplary embodiment may include the predictor 220, the residual processor 230, and the entropy encoder 240. However, in some cases, all components illustrated in FIG. 10 may not be the essential components of the encoding apparatus, and the encoding apparatus may be implemented by a larger number or a smaller number of components than the components illustrated in FIG. 10.

The predictor 220, the residual processor 230, and the entropy encoder 240 in the encoding apparatus according to the exemplary embodiment may be implemented by a separate chip, respectively, or at least two components may also be implemented by one chip.

The encoding apparatus according to the exemplary embodiment may derive an advanced temporal motion vector prediction (ATMVP) candidate for a current block (S900). More specifically, the predictor 220 of the encoding apparatus may derive the ATMVP candidate for the current block.

The encoding apparatus according to the exemplary embodiment may derive merge candidates for the current block (S910). More specifically, the predictor 220 of the encoding apparatus may derive the merge candidates for the current block. As an example, the merge candidates may indicate affine merge candidates, merge subblock candidates, subblock merge candidates, or normal merge candidates. As another example, the merge candidates for the current block may be derived based on the ATMVP candidate, but the example is not limited thereto. For example, the merge candidates for the current block may also be derived independently of the ATMVP candidate.

The encoding apparatus according to the exemplary embodiment may derive prediction samples for the current block based on the merge candidates and the ATMVP candidate (S920). More specifically, the predictor 220 of the encoding apparatus may derive the prediction samples for the current block based on the merge candidates and the ATMVP candidate. As an example, the ATMVP candidate may also be interpreted as a concept included in the merge candidates. As another example, a merge candidate list including the ATMVP candidate and the merge candidates may be derived, and the prediction samples for the current block may be derived based on the derived merge candidate list. As still another example, a merge candidate list including the merge candidates may be derived, and the prediction samples for the current block may be derived based on the merge candidate list and the ATMVP candidate.

The encoding apparatus according to the exemplary embodiment may derive residual samples for the current block based on the prediction samples (S930). More specifically, the residual processor 230 of the encoding apparatus may derive the residual samples for the current block based on the prediction samples.

The encoding apparatus according to the exemplary embodiment may encode image information including information about the residual samples (S940). More specifically, the entropy encoder 240 of the encoding apparatus may encode the image information including the information about the residual samples.

According to the exemplary embodiment, the ATMVP candidate may be characterized by being a spatial neighboring block spatially adjacent to the current block.

The encoding apparatus according to the exemplary embodiment may configure a temporary candidate list based on neighboring blocks of the current block and derive the ATMVP candidate for the current block among the ATMVP candidates included in the configured temporary candidate list, in the step of deriving the ATMVP candidate.

According to the exemplary embodiment, the spatial neighboring block may be a left neighboring block adjacent to a left of the current block.

The encoding apparatus according to the exemplary embodiment may determine the left neighboring block adjacent to the left of the current block as the ATMVP candidate, in the step of deriving the ATMVP candidate.

According to the exemplary embodiment, neighboring blocks excluding the left neighboring block among the neighboring blocks for the current block may be characterized by being not determined as the ATMVP candidate.

According to the exemplary embodiment, the neighboring blocks excluding the left neighboring block may include all spatial neighboring blocks and all temporal neighboring blocks of the current block.

According to the exemplary embodiment, based on the fact indicating that a coordinate indicating a position of a top-left sample of the current block is determined as (xCb, yCb), a coordinate indicating a position of one sample included in the left neighboring block may be determined as (xCb−1, yCb+cbHeight−1), and the cbHeight may refer to a height of the current block. As an example, the coordinate (xCb−1, yCb+cbHeight−1) may correspond to the position of the No. 1 neighboring block illustrated in FIG. 7.

According to the encoding apparatus and the operation method of the encoding apparatus illustrated in FIGS. 9 and 10, the encoding apparatus may derive the advanced temporal motion vector prediction (ATMVP) candidate for the current block (S900), derive the merge candidates for the current block (S910), derive the prediction samples for the current block based on the merge candidates and the ATMVP candidate (S920), derive the residual samples for the current block based on the prediction samples (S930), and encode the image information including the information about the residual samples (S940), and at this time, the ATMVP candidate may be the spatial neighboring block spatially adjacent to the current block. That is, according to the contents described above with reference to FIGS. 9 and 10, it is possible to enhance image coding efficiency by determining the spatial neighboring block adjacent to the left of the current block (or current transform block) as the ATMVP candidate to perform the image coding, without generating the temporary candidate list including the ATMVP candidates.

FIG. 11 is a flowchart illustrating an operation of the decoding apparatus according to the exemplary embodiment, and FIG. 12 is a block diagram illustrating a configuration of the decoding apparatus according to the exemplary embodiment.

Each step illustrated in FIG. 11 may be performed by the decoding apparatus 300 illustrated in FIG. 3. More specifically, S1100 and S1120 may be performed by the predictor 330 illustrated in FIG. 3, and S1130 may be performed by the adder 340 illustrated in FIG. 3. Further, operations according to the S1100 to S1130 are based on some of the contents described above with reference to FIGS. 4 to 8. Therefore, a description of specific contents overlapping with the contents described above with reference to FIGS. 3 to 8 will be omitted or simplified.

As illustrated in FIG. 12, the decoding apparatus according to the exemplary embodiment may include the predictor 330 and the adder 340. However, in some cases, all components illustrated in FIG. 12 may be not the essential components of the decoding apparatus, and the decoding apparatus may be implemented by a larger number or a smaller number of components than the components illustrated in FIG. 12.

The predictor 330 and the adder 340 in the decoding apparatus according to the exemplary embodiment may be implemented by a separate chip, respectively, or at least two components may also be implemented by one chip.

The decoding apparatus according to the exemplary embodiment may derive an advanced temporal motion vector prediction (ATMVP) candidate for a current block (S1100). More specifically, the predictor 330 of the decoding apparatus may derive the ATMVP candidate for the current block.

The decoding apparatus according to the exemplary embodiment may derive merge candidates for the current block (S1110). More specifically, the predictor 330 of the decoding apparatus may derive the merge candidates for the current block. As an example, the merge candidates may indicate affine merge candidates, merge subblock candidates, subblock merge candidates, or normal merge candidates. As another example, the merge candidates for the current block may be derived based on the ATMVP candidate, but the example is not limited thereto. For example, the merge candidates for the current block may also be derived independently of the ATMVP candidate.

The decoding apparatus according to the exemplary embodiment may derive prediction samples for the current block based on the merge candidates and the ATMVP candidate (S1120). More specifically, the predictor 330 of the decoding apparatus may derive the prediction samples for the current block based on the merge candidates and the ATMVP candidate. As an example, the ATMVP candidate may also be interpreted as a concept included in the merge candidates. As another example, a merge candidate list including the ATMVP candidate and the merge candidates may be derived, and the prediction samples for the current block may be derived based on the derived merge candidate list. As still another example, the merge candidate list including the merge candidates may be derived, and the prediction samples for the current block may be derived based on the merge candidate list and the ATMVP candidate.

The decoding apparatus according to the exemplary embodiment may derive reconstructed samples for the current block based on the prediction samples (S1130). More specifically, the adder 340 of the decoding apparatus may derive the reconstructed samples of the current block based on the prediction samples.

According to the exemplary embodiment, the ATMVP candidate may be characterized by being a spatial neighboring block spatially adjacent to the current block.

The decoding apparatus according to the exemplary embedment may configure a temporary candidate list based on neighboring blocks of the current block and derive the ATMVP candidate for the current block among the ATMVP candidates included in the configured temporary candidate list, in the step of deriving the ATMVP candidate.

According to the exemplary embodiment, the spatial neighboring block may be a left neighboring block adjacent to the left of the current block.

The decoding apparatus according to the exemplary embodiment may determine the left neighboring block adjacent to the left of the current block as the ATMVP candidate, in the step of deriving the ATMVP candidate.

According to the exemplary embodiment, the neighboring blocks excluding the left neighboring block among the neighboring blocks for the current block may not be determined as the ATMVP candidate.

According to the exemplary embodiment, the neighboring blocks excluding the left neighboring block may include spatial neighboring blocks and temporal neighboring blocks of the current block.

According to the exemplary embodiment, based on the fact indicating that the coordinate indicating the position of the top-left sample of the current block is determined as (xCb, yCb), the coordinate indicating the position of one sample included in the left neighboring block may be determined as (xCb−1, yCb+cbHeight−1), and at this time, the cbHeight may refer to the height of the current block. As an example, the coordinate (xCb−1, yCb+cbHeight−1) may correspond to the position of the No. 1 neighboring block illustrated in FIG. 7.

According to the exemplary embodiment, the process of deriving the ATMVP candidate described above with reference to FIGS. 4 to 8 may be based on the contents of the English specification including Sections 1.1.1.1 to 1.1.1.3 below.

1.1.1.1 Derivation Process for Subblock-Based Temporal Merging Candidates

Inputs to this process are:

- a luma location (xCb, yCb) of the top-left sample of the current luma coding block relative to the top-left luma sample of the current picture,
- a variable cbWidth specifying the width of the current coding block in luma samples,
- a variable cbHeight specifying the height of the current coding block in luma samples.
- the availability flags availableFlagCandidatePos of predefined MV information
- the reference indices refIdxLXCandidatePos of predefined MV information
- the prediction list utilization flags predFlagLXCandidatePos of predefined MV information
- the motion vectors in 1/16 fractional-sample accuracy mvLXCandidatePos of predefined MV information Outputs of this process are:

- the availability flag availableFlagSbCol,
- the number of luma coding subblocks in horizontal direction numSbX and in vertical direction numSbY,
- the reference indices refIdxL0SbCol and refIdxL1SbCol,
- the luma motion vectors in 1/16 fractional-sample accuracy mvLOSbCol[xSbIdx][ySbIdx] and mvL1SbCol[xSbIdx][ySbIdx] with xSbIdx=0 . . . numSbX−1, ySbIdx=0 . . . numSbY−1,
- the prediction list utilization flags predFlagLOSbCol[xSbIdx][ySbIdx] and predFlagL1SbCol[xSbIdx][ySbIdx] with xSbIdx=0 . . . numSbX−1, ySbIdx=0 . . . numSbY−1.

The availability flag availableFlagSbCol is derived as follows.

If either slice_temporal_mvp_enable_flag or sps_sbtmvp_flag is equal to 0, availableFlagSbCol is set equal to 0.

Otherwise, the following ordered steps apply.

1. The location (xCtb, yCtb) of the top-left sample of the luma coding tree block that contains the current coding block and the location (xCtr, yCtr) of the below-right center sample of the current luma coding block are derived as follows:

$$xCtb=(xCb>>Ctu\ \mathrm{Log\ 2Size})<<Ctu\ \mathrm{Log\ 2Size} \quad (8\text{-}144)$$

$$yCtb=(yCb>>Ctu\ \mathrm{Log\ 2Size})<<Ctu\ \mathrm{Log\ 2Size} \quad (8\text{-}145)$$

$$xCtr=xCb+(cbWidth/2) \quad (8\text{-}146)$$

$$yCtr=yCb+(cbHeight/2) \quad (8\text{-}147)$$

2. The luma location (xColCtrCb, yColCtrCb) is set equal to the top-left sample of the collocated luma coding block covering the location given by (xCtr, yCtr) inside ColPic relative to the top-left luma sample of the collocated picture specified by ColPic.

3. The derivation process for subblock-based temporal merging base motion data as specified in clause 1.1.1.2 is invoked with the location (xCtb, yCtb), the location (xColCtrCb, yColCtrCb), the availability flags availableFlagCandidatePos, and the prediction list utilization flags pred- FlagLXCandidatePos, and the reference indices refIdxLXCandidatePos, and the motion vectors mvLXCandidatePos, with X being 0 and 1 as inputs and the motion vectors ctrMvLX, the prediction list utilization flags ctrPredFlagLX and the reference indices ctrRefIdxLX of the collocated block, with X being 0 and 1, and the temporal motion vector tempMV as outputs.

4. The variable availableFlagSbCol is derived as follows:

If both ctrPredFlagL0 and ctrPredFlagL1 are equal to 0, availableFlagSbCol is set equal to 0.

Otherwise, availableFlagSbCol is set equal to 1.

When availableFlagSbCol is equal to 1, the following applies:

The variables numSbX, numSbY, sbWidth, sbHeight and refIdxLXSbCol are derived as follows:

numSbX=max(cbWidth>>Log 2SbtmvpSize, 1) (8-148)

numSbY=max(cbHeight>>Log 2SbtmvpSize, 1) (8-149)

sbWidth=cbWidth/numSbX (8-150)

sbHeight=cbHeight/numSbY (8-151)

refIdxLXSbCol=0 (8-152)

For xSbIdx=0 . . . numSbX−1 and ySbIdx=0 . . . numSbY−1, the motion vectors mvLXSbCol[xSbIdx][ySbIdx] and prediction list utilization flags predFlagLXSbCol[xSbIdx][ySbIdx] are derived as follows:

The luma location (xSb, ySb) specifying the top-left sample of the current coding subblock relative to the top-left luma sample of the current picture is derived as follows:

*xSb*=*xCb*+xSbIdx*sbWidth (8-153)

*ySb*=*yCb*+ySbIdx*sbHeight (8-154)

The location (xColSb, yColSb) of the collocated subblock inside ColPic is derived as follows.

xColSb=Clip3(xCtb,

Min(CurPicWidthInSamplesY−1, xCtb+(1<<*Ctb* Log 2SizeY)+3), (8-155)

*xSb*+(tempMv[0]>>4))

yColSb=Clip3(yCtb,

MinCurPicHeightInSamplesY−1, yCtb+(1<<*Ctb* Log 2SizeY)+3), (8-156)

*ySb*+(tempMv[1]>>4))

The variable currCb specifies the luma coding block covering the sub-block inside the current picture.

The variable colCb specifies the luma coding block covering the modified location given by ((xColSb>>3)<<3, (yColSb>>3)<<3) inside the ColPic.

The luma location (xColCb, yColCb) is set equal to the top-left sample of the collocated luma coding block specified by colCb relative to the top-left luma sample of the collocated picture specified by ColPic.

The derivation process for collocated motion vectors as specified in clause 1.1.1.3 is invoked with currCb, colCb, (xColCb, yColCb), refIdxL0 set equal to 0 and sbFlag set equal to 1 as inputs and the output being assigned to the motion vector of the subblock mvLOSbCol[xSbIdx][ySbIdx] and availableFlagL0SbCol.

The derivation process for collocated motion vectors as specified in clause 1.1.1.3 is invoked with currCb, colCb, (xColCb, yColCb), refIdxL1 set equal to 0 and sbFlag set equal to 1 as inputs and the output being assigned to the motion vector of the subblock mvL1SbCol[xSbIdx][ySbIdx] and availableFlagL1SbCol.

When availableFlagLOSbCol and availableFlagL1SbCol are both equal to 0, the following applies:

mvLXSbCol[xSbIdx][ySbIdx]=ctrMvLX (8-157)

predFlagLXSbCol[xSbIdx][ySbIdx]=ctrPredFlagLX (8-158)

1.1.1.2 Derivation Process for Subblock-Based Temporal Merging Base Motion Data

Inputs to this process are:

the location (xCtb, yCtb) of the top-left sample of the luma coding tree block that contains the current coding block, the location (xColCtrCb, yColCtrCb) of the top-left sample of the collocated luma coding block that covers the below-right center sample.

the availability flags availableFlag$A_0$, availableFlag$A_1$, availableFlag$B_0$, and availableFlag$B_1$ of the neighbouring coding units, the reference indices refIdxLX$A_0$, refIdxLX$A_1$, refIdxLX$B_0$, and refIdxLX$B_1$ of the neighbouring coding units, the prediction list utilization flags predFlagLX$A_0$, predFlagLX$A_1$, predFlagLX$B_0$, and predFlagLX$B_1$ of the neighbouring coding units, the motion vectors in 1/16 fractional-sample accuracy mvLX$A_0$, mvLX$A_1$, mvLX$B_0$, and mvLX$B_1$ of the neighbouring coding units.

Outputs of this process are:

the motion vectors ctrMvL0 and ctrMvL1, the prediction list utilization flags ctrPredFlagL0 and ctrPredFlagL1, the reference indices ctrRefIdxL0 and ctrRefIdxL1, the temporal motion vector tempMV.

The variables tempMv, numRefLists and bTerminate are set as follows:

tempMv[0]=0 (8-159)

tempMv[0]=0 (8-160)

numRefLists=(slice_type==*B*)?2:1 (8-161)

bTerminate=FALSE (8-162)

The variable currPic specifies the current picture.

For each reference picture list LX with X ranging from 0 to (numRefList−1), mvTemp is derived as follows:

1. When all of the following conditions are equal to true, X is set equal to !X:

DiffPicOrderCnt (aPic, currPic) is less than or equal to 0 for every picture aPic in every reference picture list of the current slice, slice_type is equal to B, collocated_from_10_flag is equal to 0.

2. When bTerminate is equal to FALSE, and availableFlagA0 and predFlagLXA0 are equal to 1 and DiffPicOrderCnt (ColPic, RefPicListX[refIdxLXA0]) is equal to 0, b Terminate is set to TRUE and mvTemporal is set equal to mvLXA0:

3. When bTerminate is equal to FALSE, availableFlagLB0 and predFlagLXB0 are equal to 1, DiffPicOrderCnt (ColPic, RefPicListX[refIdxLXB0]) is equal to 0, b Terminate is set to TRUE and mvTemporal is set equal to mvLXB0.

4. When bTerminate is equal to FALSE, availableFlagB1 and predFlagLXB1 are equal to 1, DiffPicOrderCnt (ColPic, RefPicListX[refIdxLXB1]) is equal to 0, bTerminate is set to TRUE and mvTemporal is set equal to mvLXB1.

5. When bTerminate is equal to FALSE, availableFlagA1 and predFlagLXB1 are equal to 1, DiffPicOrderCnt (ColPic, RefPicListX [refIdxLXA1]) is equal to 0, b Terminate is set to TRUE and mvTemporal is set to mvLXA1.

The location (xColCb, yColCb) of the collocated block inside ColPic is derived as follows.

xColCb=Clip3(xCtb, Min(CurPicWidthInSamplesY−1, xCtb+(1<<*Ctb* Log 2SizeY)+3), (8-163)

xColCtrCb+(tempMv[0]>>4))

yColCb=Clip3(yCtb, Min(CurPicHeightInSamplesY−1, yCtb+(1<<*Ctb* Log 2SizeY)+3), (8-164)

yColCtrCb+(tempMv[1]>>4))

The array colPredMode is set equal to the prediction mode array CuPredMode of the collocated picture specified by ColPic.

The motion vectors ctrMvL0 and ctrMvL1, the prediction list utilization flags ctrPredFlagL0 and ctrPredFlagL1, and the reference indices ctrRefIdxL0 and ctrRefIdxL1 are derived as follows:

If colPredMode[xColCb][yColCb] is equal to MODE_INTER, the following applies:

The variable currCb specifies the luma coding block covering (xCtrCb,yCtrCb) inside the current picture.

The variable colCb specifies the luma coding block covering the modified location given by ((xColCh>>3)<<3, (yColCb>>3)<<3) inside the ColPic.

The luma location (xColCb, yColCb) is set equal to the top-left sample of the collocated luma coding block specified by colCb relative to the top-left luma sample of the collocated picture specified by ColPic.

The derivation process for temporal motion vector prediction in subclause 1.1.1.3 is invoked with currCb, colCb, (xColCb, yColCb), centerRefIdxL0, and sbFlag set equal to 1 as inputs and the output being assigned to centerMvL0 and centerPredFlagL0.

The derivation process for temporal motion vector prediction in subclause 1.1.1.3 is invoked with currCb, colCb, (xColCb, yColCb), centerRefIdxL1, and sbFlag set equal to 1 as inputs and the output being assigned to centerMvL1 and centerPredFlagL1.

Otherwise, the following applies:

ctrPredFlagL0=0 (8-165)

ctrPredFlagL1=0 (8-166)

1.1.1.3 Derivation Process for Collocated Motion Vectors

Inputs to this process are:

a variable currCb specifying the current coding block, a variable colCb specifying the collocated coding block inside the collocated picture specified by ColPic, a luma location (xColCb, yColCb) specifying the top-left sample of the collocated luma coding block specified by colCb relative to the top-left luma sample of the collocated picture specified by ColPic, a reference index refIdxLX, with X being 0 or 1, a flag indicating a subblock temporal merging candidate sbFlag.

Outputs of this process are:

the motion vector prediction mvLXCol in 1/16 fractional-sample accuracy, the availability flag availableFlagLXCol.

The variable currPic specifies the current picture.

The arrays predFlagL0Col[x][y], mvL0Col[x][y] and refIdxL0Col[x][y] are set equal to PredFlagL0[x][y], MvL0[x][y] and RefIdxL0[x][y], respectively, of the collocated picture specified by ColPic, and the arrays predFlagLICol[x] [y], mvL1Col [x] [y] and refIdxLICol [x] [y] are set equal to PredFlagLI [x] [y], MvL1[x][y] and RefIdxL1[x][y], respectively, of the collocated picture specified by ColPic.

[Ed. (BB): Define ColPic NoBackwardPredFlag.]

The variables mvLXCol and availableFlagLXCol are derived as follows:

If colCb is coded in an intra prediction mode, both components of mvLXCol are set equal to 0 and availableFlagLXCol is set equal to 0.

Otherwise, the motion vector mvCol, the reference index refIdxCol and the reference list identifier listCol are derived as follows:

If sbFlag is equal to 0, availableFlagLXCol is set to 1 and the following applies:

If predFlagL0Col[xColCb][yColCb] is equal to 0, mvCol, refIdxCol and listCol are set equal to mvL1Col[xColCh][yColCh], refIdxL1Col[xColCh][yColCb] and L1, respectively.

Otherwise, if predFlagL0Col[xColCb][yColCb] is equal to 1 and predFlagL1Col[xColCb][yColCb] is equal to 0, mvCol, refIdxCol and listCol are set equal to mvL0Col[xColCb][yColCh], refIdxL0Col[xColCh][yColCb] and L0, respectively.

Otherwise (predFlagL0Col[xColCb][yColCb] is equal to 1 and predFlagL1Col[xColCb][yColCb] is equal to 1), the following assignments are made:

If NoBackwardPredFlag is equal to 1, mvCol, refIdxCol and listCol are set equal to mvLXCol[xColCb][yColCh], refIdxLXCol[xColCb][yColCb] and LX, respectively.

Otherwise, mvCol, refIdxCol and listCol are set equal to mvLNCol[xColCb][yColCb], refIdxLNCol[xColCh][yColCb] and LN, respectively, with N being the value of collocated_from_10_flag.

Otherwise (sbFlag is equal to 1), the following applies:

If PredFlagLXCol[xColCb][yColCb] is equal to 1, mvCol, refIdxCol, and listCol are set equal to mvLXCol[xColCb][yColCb], refIdxLXCol[xColCb][yColCb], and LX, respectively, availableFlagLXCol is set to 1.

Otherwise (PredFlagLXCol[xColCb][yColCb] is equal to 0), the following applies:

If DiffPicOrderCnt(aPic, currPic) is less than or equal to 0 for every picture aPic in every reference picture list of the current slice and PredFlagLYCol[xColCb][yColCb] is equal to 1, mvCol, refIdxCol, and listCol are set to mvLYCol[xColCh][yColCb], refIdxLYCol[xColCb][yColCh] and LY, respectively, with Y being equal to !X where X being the value of X this process is invoked for. availableFlagLXCol is set to 1.

Both the components of mvLXCol are set to 0 and availableFlagLXCol is set equal to 0.

When availableFlagLXCol is equal to TRUE, mvLXCol and availableFlagLXCol are derived as follows:

If LongTermRefPic(currPic, currCb, refIdxLX, LX) is not equal to LongTermRefPic(ColPic, colCb, refIdxCol, listCol), both components of mvLXCol are set equal to 0 and availableFlagLXCol is set equal to 0.

Otherwise, the variable availableFlagLXCol is set equal to 1, refPicListCol[refIdxCol] is set to be the picture with reference index refIdxCol in the reference picture list listCol of the slice containing coding block colCb in the collocated picture specified by ColPic, and the following applies:

colPocDiff=DiffPicOrderCnt(ColPic, refPicListCol [refIdxCol]) (8-229)

currPocDiff=DiffPicOrderCnt(currPic, RefPicListX [refIdxLX]) (8-230)

If RefPicListX[refIdxLX] is a long-term reference picture, or colPocDiff is equal to currPocDiff, mvLXCol is derived as follows:

mvLXCol=mvCol (8-231)

Otherwise, mvLXCol is derived as a scaled version of the motion vector mvCol as follows:

$tx=(16384+(\mathrm{Abs}(td)>>1))/td$ (8-232)

$\mathrm{distScaleFactor}=\mathrm{Clip3}(-4096, 4095, (tb*tx+32)>>6)$ (8-233)

mvLXCol=Clip3(−32768, 32767, Sign (distScaleFactor*mvCol)* ((Abs (distScaleFactor*mvCol)+127)>>8)) (8-234)

where td and tb are derived as follows:

$td=\mathrm{Clip3}(-128, 127, \mathrm{colPocDiff})$ (8-235)

$tb=\mathrm{Clip3}(-128, 127, \mathrm{currPocDiff})$ (8-236)

According to the decoding apparatus and the operation method of the decoding apparatus illustrated in FIGS. 11 and 12, the decoding apparatus may derive the advanced temporal motion vector prediction (ATMVP) candidate for the current block (S1100), derive the merge candidates for the current block (S1110), derive the prediction samples for the current block based on the merge candidates and the ATMVP candidate (S1120), and derive the reconstructed samples for the current block based on the prediction samples (S1130), and at this time, the ATMVP candidate may be characterized by being the spatial neighboring block spatially adjacent to the current block. That is, according to the contents described above with reference to FIGS. 11 and 12, it is possible to enhance image coding efficiency by determining the spatial neighboring block adjacent to the left of the current block (or current transform block) as the ATMVP candidate to perform the image coding, without generating the temporary candidate list including the ATMVP candidates.

In the above-described embodiment, the methods are described based on the flowchart having a series of steps or blocks, but the present disclosure is not limited to the order of the above steps or blocks and some steps may occur simultaneously or in a different order from other steps as described above. Further, those skilled in the art will understand that the steps shown in the above flowchart are not exclusive, that further steps may be included, or that one or more steps in the flowchart may be deleted without affecting the scope of the present disclosure.

The method according to the present disclosure described above may be implemented in software. The encoding apparatus and/or decoding apparatus according to the present disclosure may be included in a device that performs image processing, for example, a TV, a computer, a smartphone, a set-top box, or a display device.

When the embodiments of the present disclosure are implemented in software, the above-described method may be implemented by modules (processes, functions, and so on) that perform the functions described above. Such modules may be stored in memory and executed by a processor. The memory may be internal or external to the processor, and the memory may be coupled to the processor using various well-known means. The processor may include an application-specific integrated circuit (ASIC), other chipsets, a logic circuit and/or a data processing device. The memory may include a ROM (read-only memory), a RAM (random access memory), a flash memory, a memory card, a storage medium, and/or other storage device. That is, the embodiments described in the present disclosure may be implemented and performed on a processor, a microprocessor, a controller, or a chip. For example, the functional units shown in each drawing may be implemented and executed on a computer, a processor, a microprocessor, a controller, or a chip. In this case, information (ex. Information on instructions) for implementation or an algorithm may be stored in a digital storage medium.

In addition, the decoding apparatus and the encoding apparatus to which the present disclosure is applied may be applied to multimedia communication devices such as a multimedia broadcasting transmitting and receiving device, a mobile communication terminal, a home cinema video device, a digital cinema video device, a surveillance camera, a video chatting device, (3D) video devices, video telephony video devices, and medical video devices, and the like, which may be included in, for example, a storage medium, a camcorder, a video on demand (VOD) service provision device, an OTT video (Over the top video), an Internet streamlining service providing device, a 3D video device, a virtual reality (VR) device, an augmented reality (AR) device, a video call device, a transportation means terminal (e.g., vehicle (including autonomous vehicle) terminal, airplane terminal, ship terminal, etc.) and may be used to process video signals or data signals. For example, the OTT video (over the top video) device may include a game console, a Blu-ray player, an Internet access TV, a home theater system, a smartphone, a tablet PC, a digital video recorder (DVR).

Further, the processing method to which the present disclosure is applied may be produced in the form of a computer-executed program, and may be stored in a computer-readable recording medium. The multimedia data having the data structure according to the present disclosure may also be stored in a computer-readable recording medium. The computer-readable recording medium includes all kinds of storage devices and distributed storage devices in which computer-readable data is stored. The computer-readable recording medium may be, for example, a Blu-ray Disc (BD), a Universal Serial Bus (USB), a ROM, a PROM, an EPROM, an EEPROM, a RAM, a CD-ROM, magnetic tape, floppy disk, and optical data storage devices. In addition, the computer-readable recording medium includes media implemented in the form of a carrier wave (for example, transmission over the Internet). In addition, the bit stream generated by the encoding method may be stored in a computer-readable recording medium or transmitted over a wired or wireless communication network.

Further, an embodiment of the present disclosure may be implemented as a computer program product by program code, and the program code may be executed in a computer according to an embodiment of the present disclosure. The program code may be stored on a carrier readable by a computer.

Figure 13:
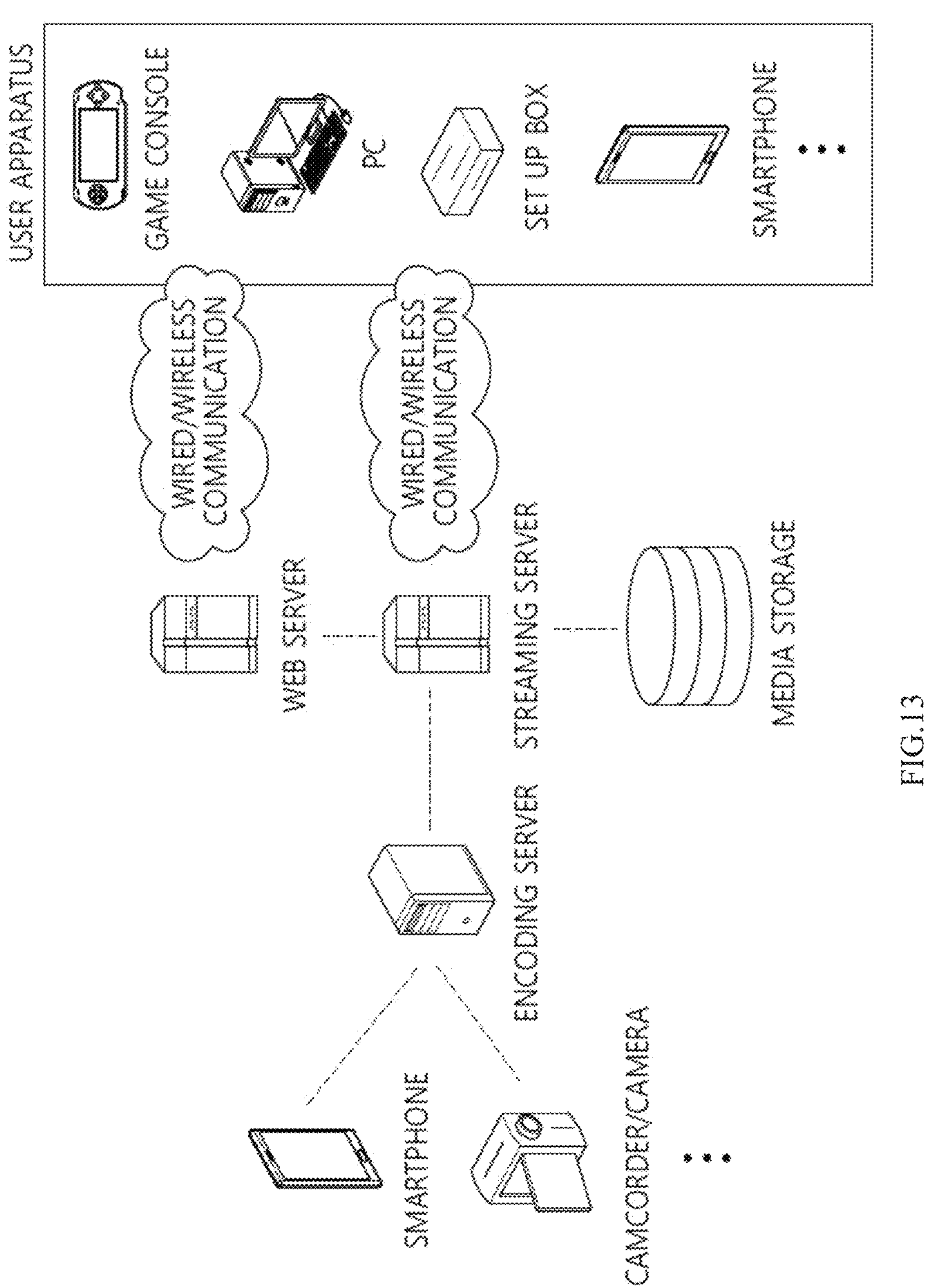
FIG. 13 is a diagram illustrating an example of a content streaming system according to the present disclosure to which the present disclosure is applicable.

FIG. 13 is a diagram illustrating a structure of a content streaming system.

Referring to FIG. 13, the content streaming system to which the present disclosure is applied may largely include an encoding server, a streaming server, a web server, a media storage, a user device, and a multimedia input device.

The encoding server serves to compress the content input from the multimedia input devices such as a smartphone, a camera, and a camcorder into the digital data to generate a bitstream and transmit the bitstream to the streaming server. As another example, if the multimedia input devices such as a smartphone, a camera, and a camcorder directly generate the bitstream, the encoding server may be omitted.

The bitstream may be generated by the encoding method to which the present disclosure is applied or the bitstream generation method, and the streaming server may temporarily store the bitstream in the process of transmitting or receiving the bitstream.

The streaming server serves to transmit the multimedia data to the user device based on the user request through the web server, and the web server serves as a medium which informs the user of what services are available. When the user requests the desired service to the web server, the web server delivers the user's request to the streaming server, and the streaming server transmits the multimedia data to the user. At this time, the content streaming system may include a separate control server, and in this case, the control server serves to control commands/responses between the devices within the content streaming system.

The streaming server may receive the contents from the media storage and/or the encoding server. For example, when receiving the contents from the encoding server, the streaming server may receive the contents in real time. In this case, to provide the smooth streaming service, the streaming server may store the bitstream for a predetermined time.

As an example of the user device, there may be a portable phone, a smartphone, a laptop computer, a digital broadcast terminal, a personal digital assistants (PDA), a portable multimedia player (PMP), a navigation device, a slate PC, a tablet PC, an ultrabook, a wearable device (e.g., a smart watch, a smart glass, a head mounted display (HMD)), a digital TV, a desktop computer, a digital signage, or the like.

The respective servers within the content streaming system may be operated by a distribution server, and in this case, the data received by each server may be distributed and processed.

What is claimed is:

1. An image decoding method performed by a decoding apparatus, the method comprising:

obtaining information related to a prediction from a bitstream;

deriving a subblock based temporal merge candidate for a current block based on the information related to the prediction;

deriving affine candidates for the current block based on the information related to the prediction;

deriving a merge candidate list for the current block, wherein the merge candidate list includes the subblock based temporal merge candidate and the affine candidates;

deriving prediction samples for the current block based on the merge candidate list; and generating reconstructed samples based on the prediction samples, wherein deriving the subblock based temporal merge candidate comprises:

deriving a motion vector of a left neighboring block of the current block;

deriving corresponding subblocks in a collocated picture based on the motion vector of the left neighboring block;

deriving subblock motion vectors of the corresponding subblocks; and deriving the subblock based temporal merge candidate based on the subblock motion vectors, wherein deriving the subblock based temporal merge candidate further comprises deriving a base motion vector based on a motion vector related to a below-right center position of the current block, wherein based on a motion vector of a corresponding subblock not being available, the base motion vector is used as the subblock motion vector of the corresponding subblock, wherein the subblock based temporal merge candidate is configured prior to the affine candidates in the merge candidate list, and wherein the subblock based temporal merge candidate is configured as a candidate in a first order of the merge candidate list.

2. An image encoding method performed by an encoding apparatus, the method comprising:

deriving a subblock based temporal merge candidate for a current block;

deriving affine candidates for the current block;

deriving a merge candidate list for the current block, wherein the merge candidate list includes the subblock based temporal merge candidate and the affine candidates;

deriving prediction samples for the current block based on the merge candidate list;

generating information related to a prediction; and encoding image information including the information related to the prediction, wherein deriving the subblock based temporal merge candidate comprises:

deriving a motion vector of a left neighboring block of the current block;

deriving corresponding subblocks in a collocated picture based on the motion vector of the left neighboring block;

deriving subblock motion vectors of the corresponding subblocks; and deriving the subblock based temporal merge candidate based on the subblock motion vectors, wherein deriving the subblock based temporal merge candidate further comprises deriving a base motion vector based on a motion vector related to a below-right center position of the current block, wherein based on a motion vector of a corresponding subblock not being available, the base motion vector is used as the subblock motion vector of the corresponding subblock, wherein the subblock based temporal merge candidate is configured prior to the affine candidates in the merge candidate list, and wherein the subblock based temporal merge candidate is configured as a candidate in a first order of the merge candidate list.

3. A non-transitory computer-readable digital storage medium storing thereon a computer program and a bitstream, wherein when processed by one or more processors, the computer program causes the one or more processors to implement an image encoding method to generate the bitstream, wherein the image encoding method comprises:

deriving a subblock based temporal merge candidate for a current block;

deriving affine candidates for the current block;

deriving a merge candidate list for the current block, wherein the merge candidate list includes the subblock based temporal merge candidate and the affine candidates;

deriving prediction samples for the current block based on the merge candidate list;

generating information related to a prediction; and encoding image information including the information related to the prediction, wherein deriving the subblock based temporal merge candidate comprises:

deriving a motion vector of a left neighboring block of the current block;

deriving corresponding subblocks in a collocated picture based on the motion vector of the left neighboring block;

deriving subblock motion vectors of the corresponding subblocks; and deriving the subblock based temporal merge candidate based on the subblock motion vectors, wherein deriving the subblock based temporal merge candidate further comprises deriving a base motion vector based on a motion vector related to a below-right center position of the current block, wherein based on a motion vector of a corresponding subblock not being available, the base motion vector is used as the subblock motion vector of the corresponding subblock, wherein the subblock based temporal merge candidate is configured prior to the affine candidates in the merge candidate list, and wherein the subblock based temporal merge candidate is configured as a candidate in a first order of the merge candidate list.

4. A transmission method of data for an image, the method comprising:

obtaining a bitstream for the image, wherein the bitstream is generated based on deriving a subblock based temporal merge candidate for a current block, deriving affine candidates for the current block, deriving a merge candidate list for the current block, wherein the merge candidate list includes the subblock based temporal merge candidate and the affine candidates, deriving prediction samples for the current block based on the merge candidate list, generating information related to a prediction, and encoding image information including the information related to the prediction; and transmitting the data comprising the bitstream, wherein deriving the subblock based temporal merge candidate comprises:

deriving a motion vector of a left neighboring block of the current block;

deriving corresponding subblocks in a collocated picture based on the motion vector of the left neighboring block;

deriving subblock motion vectors of the corresponding subblocks; and deriving the subblock based temporal merge candidate based on the subblock motion vectors, wherein deriving the subblock based temporal merge candidate further comprises deriving a base motion vector based on a motion vector related to a below-right center position of the current block, wherein based on a motion vector of a corresponding subblock not being available, the base motion vector is used as the subblock motion vector of the corresponding subblock, wherein the subblock based temporal merge candidate is configured prior to the affine candidates in the merge candidate list, and wherein the subblock based temporal merge candidate is configured as a candidate in a first order of the merge candidate list.

* * * * *